(12) United States Patent
Knuppel et al.

(10) Patent No.: US 6,691,452 B1
(45) Date of Patent: Feb. 17, 2004

(54) LIGHT WEIGHT RESPONSIVE TILT RAMP RODENT TRAP

(75) Inventors: Harry E. Knuppel, Albia, IA (US); Kathy J. Wauson, Albia, IA (US); Edward J. Yarkosky, Albia, IA (US)

(73) Assignee: Kness Mfg. Co., Inc., Albia, IA (US)

( * ) Notice: Subject to any disclaimer, the term of this patent is extended or adjusted under 35 U.S.C. 154(b) by 0 days.

(21) Appl. No.: 10/232,283

(22) Filed: Aug. 30, 2002

(51) Int. Cl.[7] ............................................... A01M 23/04
(52) U.S. Cl. ................................................ 43/69; 43/64
(58) Field of Search ............................. 43/67, 69, 70, 43/72, 74

(56) References Cited

U.S. PATENT DOCUMENTS

| | | | | |
|---|---|---|---|---|
| 119,645 A | * | 10/1871 | Rasmussen | 43/69 |
| 425,136 A | * | 4/1890 | Latta | 43/67 |
| 666,233 A | * | 1/1901 | Lindmann | 43/69 |
| 818,357 A | * | 4/1906 | Davis | 43/67 |
| 877,138 A | * | 1/1908 | Stone | 43/67 |
| 1,668,367 A | * | 5/1928 | Henstchel | 43/70 |
| 1,726,493 A | * | 8/1929 | Kelley | 43/67 |
| 1,810,608 A | * | 6/1931 | Jacobs | 43/70 |
| 1,948,586 A | * | 2/1934 | Mace | 43/76 |
| 3,936,972 A | * | 2/1976 | Meyers et al. | 43/69 |
| 4,103,448 A | * | 8/1978 | Souza | 43/67 |
| 4,151,673 A | * | 5/1979 | Campbell | 43/67 |
| 4,388,775 A | * | 6/1983 | Wright | 43/69 |
| 6,481,151 B1 | * | 11/2002 | Johnson et al. | 43/69 |
| 2001/0047613 A1 | * | 12/2001 | Caffagni | 43/85 |
| 2002/0066222 A1 | * | 6/2002 | Gehrat et al. | 43/61 |
| 2002/0184812 A1 | * | 12/2002 | Gehret et al. | 43/61 |
| 2002/0184813 A1 | * | 12/2002 | Johnson et al. | 43/69 |

* cited by examiner

Primary Examiner—Peter M. Poon
Assistant Examiner—Joan M. Olszewski
(74) Attorney, Agent, or Firm—McKee, Voorhees & Sease, P.L.C.

(57) ABSTRACT

A rodent trap includes a box having one or more entrance tubes provided therein. The entrance tubes are in communication with a mouse hole in the side wall of the box. Within each tube is a tilt ramp that tilts in response to a weight of 4 grams at a distance of one and 5/16 inches from the pivot axis to the tilt ramp.

13 Claims, 5 Drawing Sheets

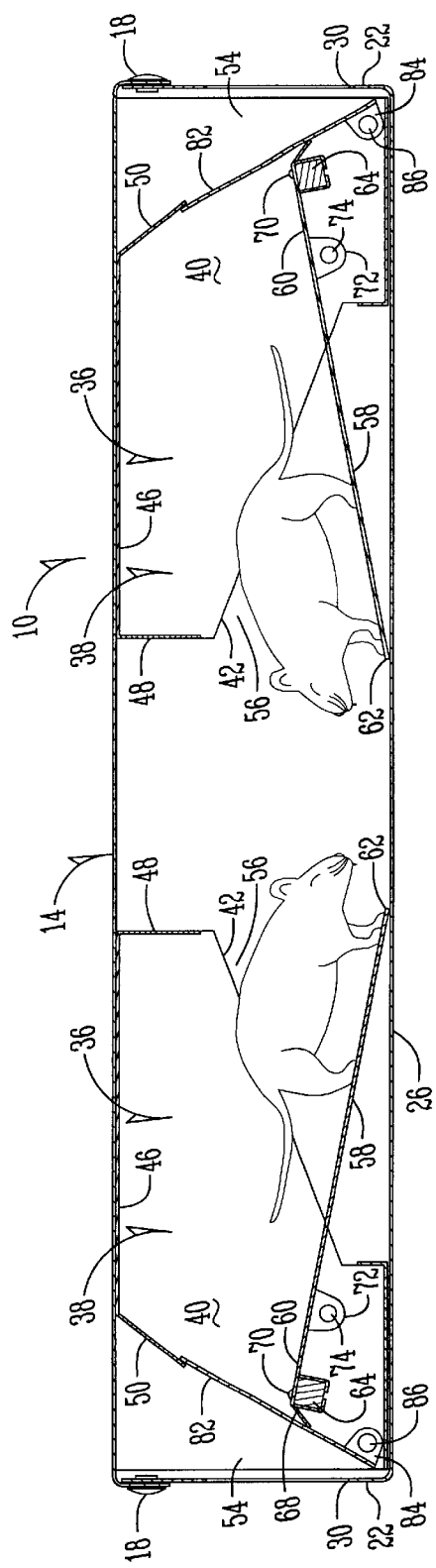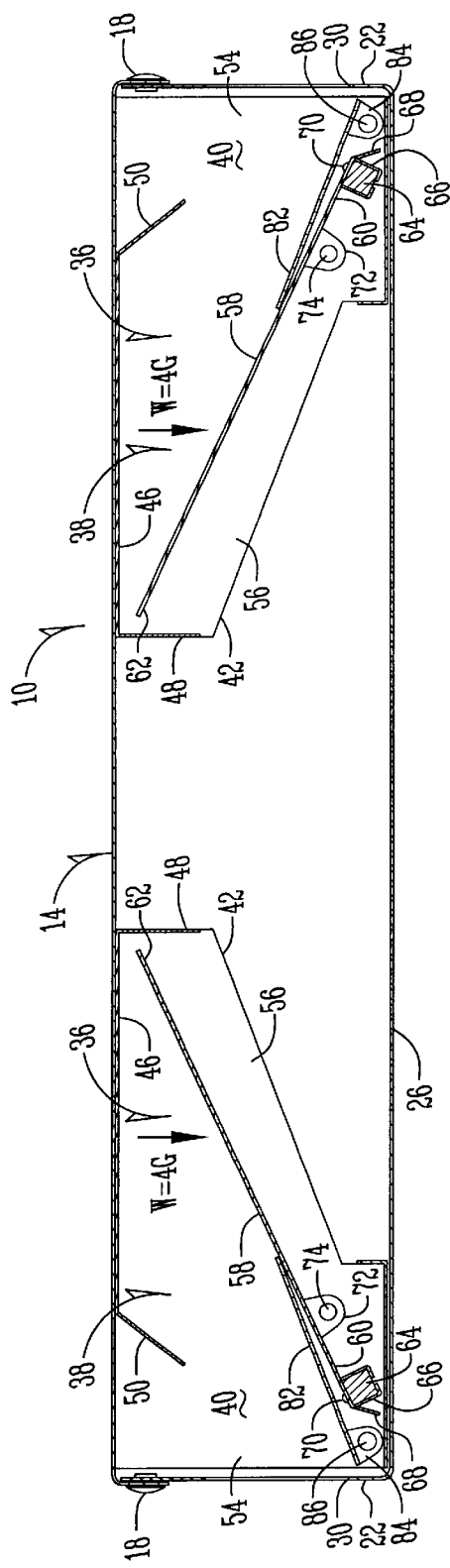

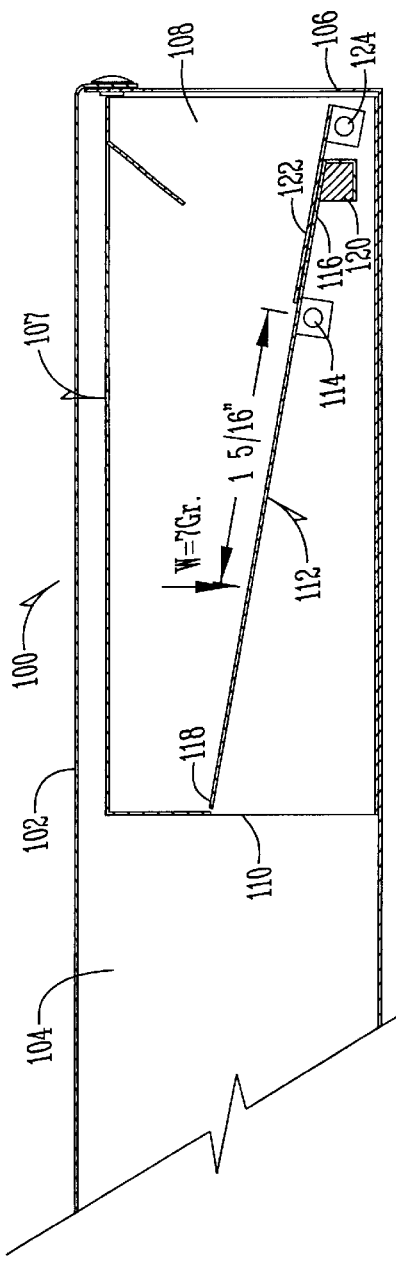
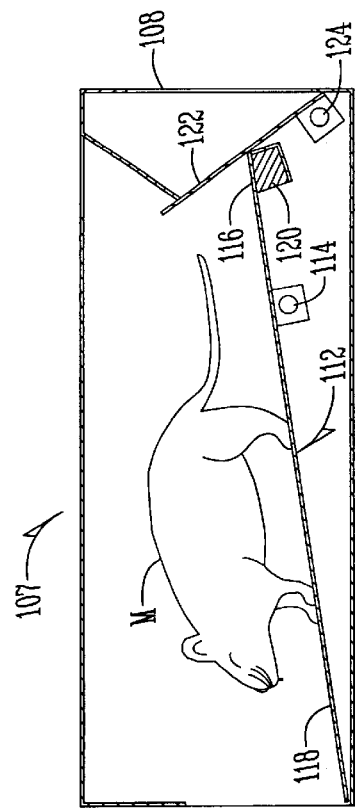
Fig. 7 (PRIOR ART)
Fig. 8 (PRIOR ART)

LIGHT WEIGHT RESPONSIVE TILT RAMP RODENT TRAP

BACKGROUND OF THE INVENTION

The present invention relates to a light weight responsive tilt ramp rodent trap.

FIGS. 7 and 8 show a typical prior art tilt ramp trap. This trap is of the type manufactured under the trademark TIN CAT® by Woodstream Corporation, Lititz, Pennsylvania 17543. The prior art trap is designated generally by the numeral 100. It includes a box 102 which encloses a trap compartment 104. Providing entrance into the trap compartment 104 is a mouse hole 106. Within the box 102 is a tube 107 having a tube entrance opening 108 adjacent the mouse hole 106 and having a tube exit opening 110 providing communication into the trap compartment 104.

Within the tube 107 is a tilt tramp 112. Tilt ramp 112 pivots about a ramp or pin axis 114 and includes an entrance end 116 and an exit end 118. A counter weight 120 is provided on the entrance end 116 to bias the tilt ramp 112 to the position shown in FIG. 7.

A flap 122 is pivoted about a pivot pin 124 and rests by gravity on the entrance end 116 of tilt ramp 112.

When a mouse enters into the mouse hole 106, the mouse M proceeds up the ramp, and when the weight of the mouse at $1\tfrac{5}{16}^{th}$ inches from the pivot point or pin axis 114 exceeds 7 grams, the ramp tilts downwardly to the position shown in FIG. 8. At the same time the flap 122 pivots upwardly in response to frictional engagement with the end 116 of tilt ramp 112.

The above prior art device has several shortcomings. The weight of 7 grams at a distance of $1\tfrac{5}{16}^{th}$ inches from the fulcrum or pin axis 114 of the tilt ramp 112 is sufficient to cause the ramp to tilt in response to a full sized adult mouse, but is insufficient to tilt in response to a lighter weight of an immature mouse. Thus younger mice can proceed up the ramp without tilting the ramp and escape merely by returning down the ramp.

This responsiveness to 7 grams of weight is the result of several factors. One factor is the chosen weight of the counterweight 120. Another factor is the friction between the flap 122 and the entrance end 116 of the tilt ramp 112. As can be seen in FIG. 7, the flap 122 rests with its face in full engagement with the upper surface of the tilt ramp 112, and this adds to the friction required in order to tilt the tilt ramp 112. Also, there is a need to reduce the friction caused by pin axis 114 and the pivot pin 124.

Therefore, a primary object of the present invention is the provision of an improved light weight responsive tilt ramp rodent trap.

A further object of the present invention is the provision of a light weight responsive tilt ramp rodent trap which includes a tilt ramp that tilts in response to a weight of 4 grams at a distance of $1\tfrac{5}{16}^{th}$ inches from the fulcrum of the tilt ramp.

A further object of the present invention is the provision of an improved light weight responsive tilt ramp rodent trap which includes dimples and tabs for engaging the flap as the tilt ramp pivots about its tilt ramp axis, thereby reducing the friction between the flap and the tilt ramp.

A further object of the present invention is the provision of an improved hinge for the tilt ramp which reduces the friction necessary to cause the ramp to tilt.

A further object of the present invention is the provision of an improved hinge for the flap which reduces the friction necessary for the flap to pivot in response to the tilting of the tilt ramp.

A further object of the present invention is the provision of an improved counter balance which reduces the force necessary to tilt the ramp.

A further object of the present invention is the provision of a trap which includes tubes for the mouse to enter which are connected to the top wall of the trap and are pivotal to a position wherein the tubes are outside the trap for cleaning of the trap.

A further object of the present invention is the provision of an improved rounded corner on the inside of the trap box to facilitate cleaning.

A further object of the present invention is the provision of elongated ribs on the top wall of the box for improving the strength thereof.

A further object of the present invention is the provision of an improved light weight responsive tilt ramp rodent trap which is economical to manufacture, durable in use, and efficient in operation.

BRIEF SUMMARY OF THE INVENTION

The foregoing objects may be achieved by a rodent trap comprising a box having a top wall, a bottom wall, end walls, a front wall, and a rear wall enclosing a trap compartment. There is at least a first mouse opening in one of the front, rear, and side walls of the box and an elongated tube is provided within the trap compartment. The tube includes a first open end in communication with the first mouse opening and includes a second end. An elongated tilt ramp is within the tube and includes an entrance end adjacent the mouse opening of the box and also includes an exit end adjacent the exit opening of the tube.

A hinge pivotally mounts the tilt ramp within the tube for tilting movement about a hinge axis from a first position wherein the entrance end is adjacent the bottom wall of the box adjacent the mouse opening and the exit end is elevated above the entrance end, to a second position wherein the exit end is lowered from the first position.

A flap is provided on the exit end of the tilt ramp. The flap being in covering relation over the exit opening of the tube when the tilt ramp is in its first position and being removed from covering relation over the exit opening of the tube when the tilt ramp is in its second position.

A biased member is connected to the tilt ramp and biases the tilt ramp to its first position. The biased member yields in response to a weight of a mouse adjacent the exit end of the ramp to permit the tilt ramp to move to its second position. The tilt ramp is moveable from its first position to its second position in response to a downward force of 4 grams at a point between the hinge axis and the exit end of the tilt ramp and located $1\tfrac{5}{16}^{th}$ inches from the hinge axis.

According to another feature of the invention the biased member comprises a weight attached to the tilt ramp.

According to another feature of the invention the flap is hinged about a horizontal flap axis and is engaged by the entrance end of the tilt ramp. The flap pivots about its flap axis in response to movement of the tilt ramp from its first position to its second position.

According to another feature of the invention the tilt ramp includes cam surfaces projecting upwardly therefrom adjacent its entrance end. The cam surfaces bear against the flap before moving the flap about its flap axis during movement of the tilt ramp from its first to its second position.

According to another feature of the invention the tilt ramp includes angular tabs projecting from the entrance end of the tilt ramp. These angular tabs engage the flap during movement of the tilt ramp from its first position to its second position.

According to another feature of the invention the top wall is hinged to the box for movement from an open position providing axis to the trap compartment to a closed position enclosing the trap compartment. The tube in the tilt ramp are carried by the top wall of the box for movement therewith in responsive to movement of the top wall from its open to its closed position.

According to another feature of the invention the tube includes a top wall and an angular flange extending downwardly therefrom. The flap engages the angular flange when the tilt ramp is in its second position to close the first open end of the tube.

BRIEF DESCRIPTION OF THE DRAWINGS

FIG. 3 is a sectional view taken along line 3—3 of FIG. 1 and showing mice entering the trap.

FIG. 4 is a view similar to FIG. 3, but showing the tilt ramps in their normal position without mice present.

FIG. 7 is a sectional view of a prior art device.

FIG. 8 is a view similar to FIG. 7, but showing a mouse tilting the tilt ramp in the prior art device.

DETAILED DESCRIPTION OF THE INVENTION

Figure 1:
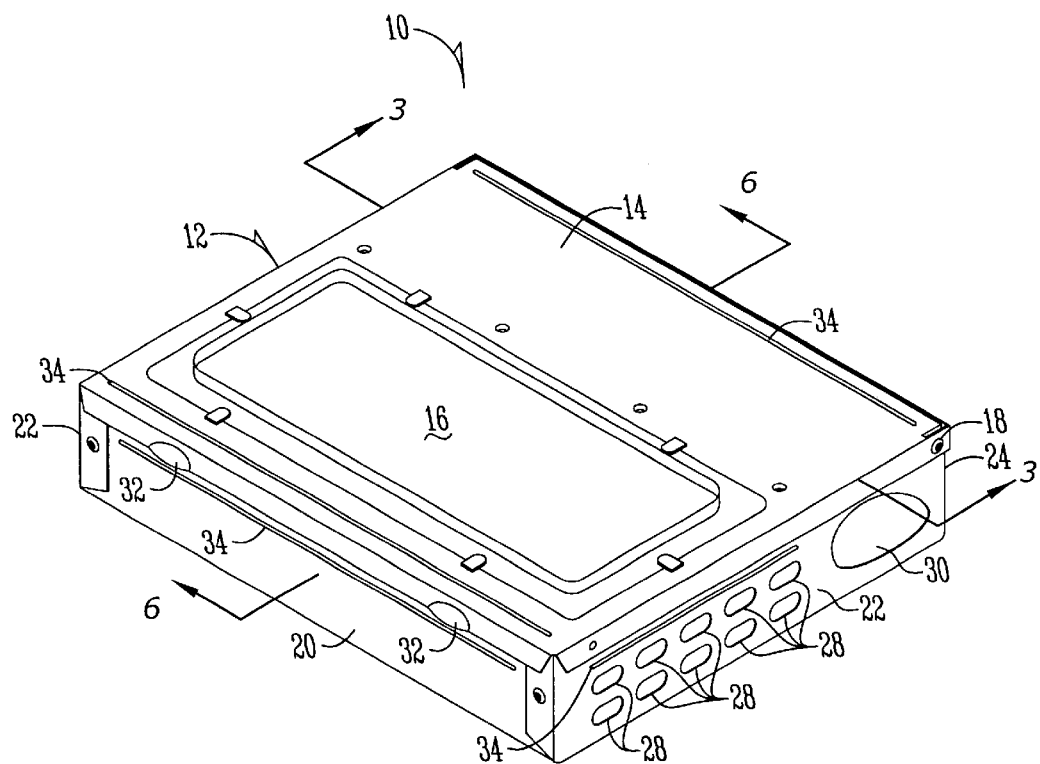
FIG. 1 is a perspective view of the lightweight responsive tilt ramp rodent trap of the present invention.
Figure 2:
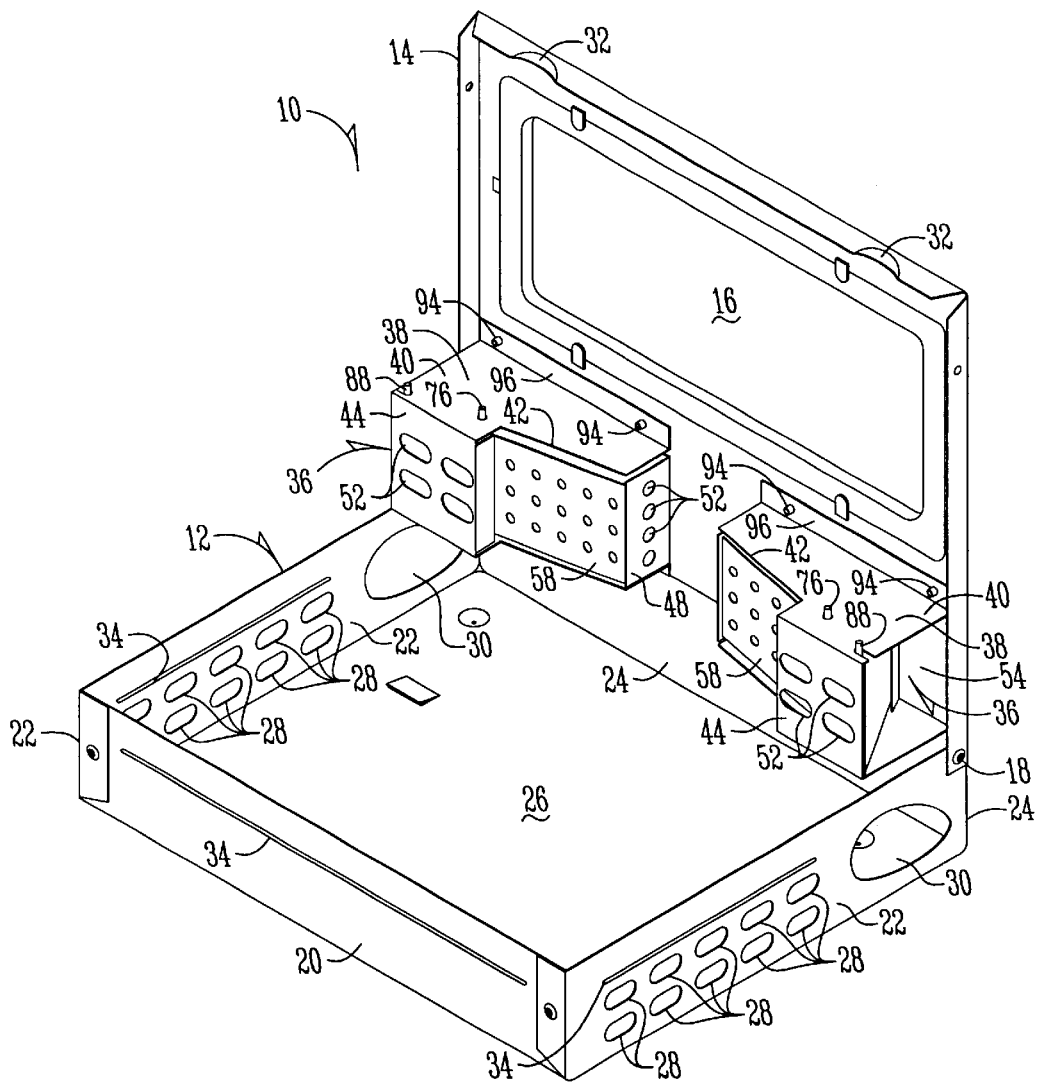
FIG. 2 is a perspective view showing the lid of the trap in its open position.

Referring to the drawings the numeral 10 generally refers to the trap of the present invention. Trap 10 includes a box 12 having a lid 14 with a transparent window 16 therein. The lid is hinged about a lid hinge 18 to a back wall 24 of box 12. Box 12 also includes a front wall 20 and opposite end walls 22. A bottom wall 26 is also provided in box 12. Opposite end walls 22 are each provided with a plurality of ventilation openings 28, and each end wall 22 includes a mouse opening 30. The lid 14 includes a pair of lift tabs 32 at its front edge for permitting an operator to grasp the lid and tilt it upwardly from the closed position shown in FIG. 1 to the open position shown in FIG. 2.

End walls 22, front wall 20, rear wall 24, and lid 14 all are provided with elongated reinforcing ribs 34 which strengthen these walls against bending.

Attached to the under surface of lid 14 are two entrance tubes 36 each of which include opposite side walls 38. Side walls 38 each include a rectangular portion 40 and an angled lowered edge 42 which extends upwardly from the rectangular portion 40. Each tube 36 also includes a bottom wall 44 and a top wall 46. Top wall 46 is provided with a vertical flange 48 at its inner end and an angled flange 50 adjacent its outer end. Vent holes 52 are provided in vertical flange 48.

Each tube 36 includes an inlet opening 54 which is adapted to register with the mouse opening 30 when the lid 14 is closed so as to prevent a mouse to enter the tube. Each tube is also provided with an outlet opening 56.

Figure 5:
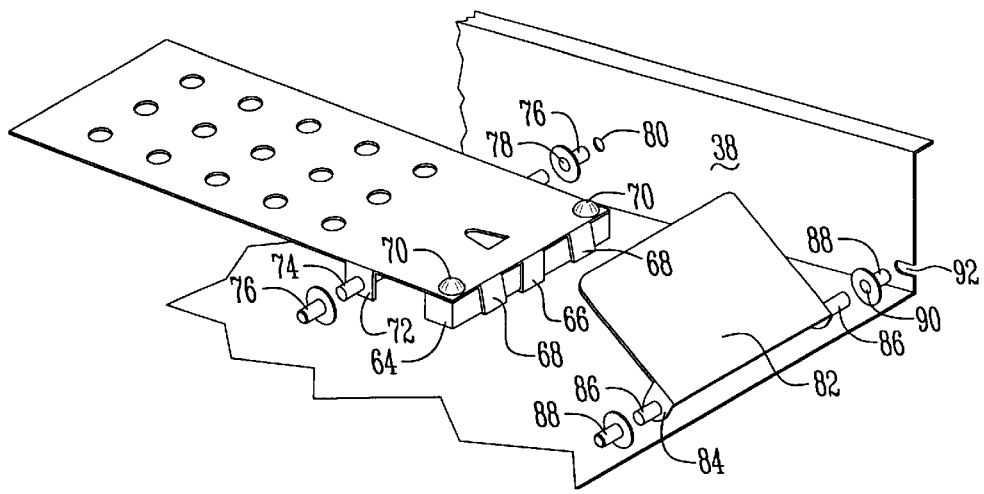
FIG. 5 is an enlarged detail exploded perspective view showing the method of attachment of the tilt ramp and the hinged flap to the tube of the present invention.

Mounted within each of the tubes 36 is a tilt ramp 58. Tilt ramp 58 includes an inlet end 60 and an outlet end 62. A counter weight 64 is attached to the inlet and 60 of the tilt ramp 58 by means of wrapped fingers 66 which extend around the counter weight and attach it to the tilt ramp 58. In addition to the wrapped fingers 66 there are angled tabs 68 which extend outwardly at an inclined angle with respect to the top surface of the tilt ramp 58. In addition, the inlet end 60 is provided with a pair of upwardly convex cam surfaces or dimples 70. A pair of hinge gears 72 extend downwardly from the tilt ramp 58 and receive an elongated hinge pin 74. As can be seen in FIG. 5, the opposite ends of the hinge pin 74 fit within a boss 76 having a receptacle 78 for receiving the ends of the hinge pin 74. The bosses 76 are press fitted within boss receiving holes 80 in the opposite walls 38 of the tubes 36. The pins 74 are free to rotate within the receptacle 78, and this substantially reduces the friction necessary for the tilt ramp 58 to pivot about the hinge pins 74. As can be seen in FIG. 4, the counter weights 64 cause the tilt ramp 58 to be normally biased in the position shown in FIG. 4 when there are no mice present. In this position the tilt ramp 58 is inclined upwardly from its entrance end 60 to its elevated exit end 62.

A tilt flap 82 includes a pair of ears 84 which receive a flap pin 86. The opposite ends of flap pin 86 extend into a pin receptacle 90 of boss 88. Bosses 88 are press fitted into the slots 92. As a result the tilt flap 82 is free to pivot about the pin 86 which rotates within the receptacles 90 of the bosses 88. As with the pin 72 and bosses 76, these bosses 88 contributes significantly to a reduction in the friction necessary to tilt flap 82 about the axis provided by flap pin 86.

Each tube 36 is attached to the lid 14 by means of rivets 94 which extend through flanges 96 of the side walls 38 of the tubes 36. Other convenient means of attachment may be used. The tilt ramps 58 and the tilt flaps 82, because they are attached to the tubes 36, move upwardly in unison with the tubes 36 when the lid is pivoted from its closed position shown in FIG. 1 to its open position shown in FIG. 2. In this open position the tubes 36 are out of registration with the mouse holes 30, and are outside the box 12. This permits cleaning of the trap and is a substantial advantage over prior art devices in that the trap can be easily and quickly cleaned.

Figure 6:
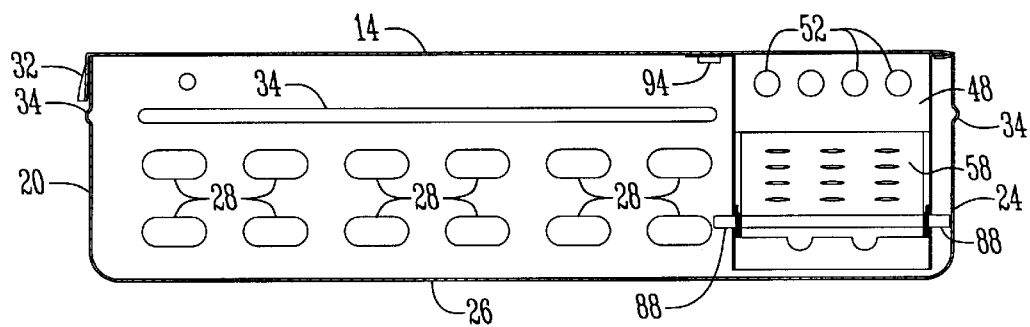
FIG. 6 is a sectional view taken along lines 6—6 of FIG. 1.

In operation, the tilt ramps 58 are normally in the position shown in FIG. 4. In this position the tilt flaps 82 rest on the upper surface of the tilt ramp 58 so that together the tilt ramp 58 and the tilt flaps 82 provide an elongated ramp for a mouse to enter through mouse hole 30. When a mouse enters the trap the mouse is drawn instinctively to the upper closed area provided at the upper exit end 62 of the tilt ramp 58. Tilt ramp 58 is adapted to tilt from its upper position shown in FIG. 4 to its lower position in FIG. 3 when a weight of 4 grams is applied to the tilt ramp at a point $1\frac{5}{16}^{th}$ inches from the pivotal axis provided by pins 74. FIG. 4 illustrates that this weight w is 4 grams. This is to be contrasted with the prior art devices such as shown in FIGS. 6 and 7 which will not tilt until a weight of 7 grams is applied $1\frac{5}{16}^{th}$ inches from the tilt pins 114. The ability of the tilt ramp 58 to pivot in response to 4 grams as opposed to 7 grams is enhanced by the counter weight 66, by the reduced friction of the pins 74 in bosses 76, by the reduced friction of pins 86 and bosses 88, and by a further reduction in friction between the flap 82 and the upper surface of the tilt ramp 58. Further friction reduction is facilitated by means of the cam surfaces or dimples 70 which engaged the tilt flap 82 during the tilting motion thereby preventing the tilt flap 82 from frictionally engaging the upper surface of the tilt ramp 58. This reduces the friction during this initial motion. In addition, the angled tabs 68 engage the tilt flap 82 as shown in FIG. 3 during the latter portion of the tilting action. This further reduces the friction between the tilt ramp 58 and the tilt flap 82.

When the tilt ramp 58 tilts to its lower position shown in FIG. 3, the flanges or angled tabs 68 engage the tilt flap 82 and cause it to engage the angled flap 50 at the top of each tube 36. This provides a barrier to prevent the mouse from exiting the trap.

A glue board (not shown) may be placed on the floor 26 of the box 12 so as to capture the mice that have entered the trap.

An advantage of the reduced weight required to tilt the tilt ramp 58 from its upper most position shown in FIG. 4 to its lowered position in FIG. 3 is that infant mice can be captured in this trap as well as adult mice. Infant mice often have a weight which is on the order of 4 grams, and in prior devices this was not sufficient weight to tilt the tilt ramp when infant mice entered the trap. The present invention captures not only adult mice but infant mice as well.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A rodent trap comprising:
   a box having a top wall, a bottom wall, end walls, a front wall, and a rear wall enclosing a trap compartment;
   at least a first mouse opening in one of the front, rear, and side walls of the box;
   an elongated tube within the trap compartment, the tube having a first open end in communication with the first mouse opening and having a second end in communication with the trap compartment;
   an elongated tilt ramp within the tube having an entrance end adjacent the mouse opening of the box and having an exit end adjacent the exit opening of the tube;
   a ramp hinge pivotally mounting the tilt ramp within the tube for tilting movement about a ramp hinge axis from a first position wherein the entrance end is adjacent the bottom wall of the box adjacent the mouse opening and the exit end is elevated above the entrance end, to a second position wherein the exit end is lowered from the first position;
   a flap hinged about a horizontal flap axis and engaging the entrance end of the tilt ramp, the flap pivoting about the flap axis in response to movement of the tilt ramp from the first position to the second position;
   cam surfaces projecting upwardly from the tilt ramp adjacent the entrance end, the cam surfaces bearing against the flap for moving the flap about the flap axis during movement of the tilt ramp from the first to the second position;
   a bias member connected to the tilt ramp and biasing the tilt ramp to the first position, the bias member yielding in response to the weight of a mouse adjacent the exit end of the tilt ramp to permit the tilt ramp to move to the second position; and
   the fit ramp being movable from the first position to the second position in response to a downward force on the tilt ramp of four grams at a point between the hinge axis and the exit end and being one and five-sixteenth inches from the hinge axis.

2. A rodent trap according to claim 1 wherein said bias member comprises a weight attached to said tilt ramp.

3. A rodent trap according to claim 1 wherein said tilt ramp further includes angular tabs projecting from said entrance end thereof and adapted to engage said flap during movement of said tilt ramp from its said first position to its said second position.

4. A rodent trap according to claim 1 wherein said top wall is hinged to said box for movement from an open position providing access into said trap compartment to a closed position enclosing said trap compartment, said tube and said tilt ramp being carried by said top wall of said box for movement therewith in response to movement of said top wall from said open to said closed positions.

5. A rodent trap according to claim 1 wherein said tube includes a top wall and an angular flange extending downwardly there from, the flap engaging the angular flange when the tilt ramp is in its said second position to close said first open end of said tube.

6. A rodent trap comprising:
   a box having a top wall, a bottom wall, end walls, a front wall, and a rear wall enclosing a trap compartment;
   at least a first mouse opening in one of the front, rear, and side walls of the box;
   an elongated tube within the trap compartment, the tube having a first open end in communication with the first mouse opening and having a second end in communication with the trap compartment;
   an elongated tilt ramp within the tube having an entrance end adjacent the mouse opening of the box and having an exit end adjacent the exit opening of the tube;
   a ramp hinge pivotally mounting the tilt ramp within the tube for tilting movement about a hinge axis from a first position wherein the entrance end is adjacent the bottom wall of the box adjacent the mouse opening and the exit end is elevated above the entrance end, to a second position wherein the exit end is lowered from the first position;
   a bias member connected to the tilt ramp and biasing the tilt ramp to the first position, the bias member yielding in response to the weight of a mouse adjacent the exit end of the tilt ramp to permit the tilt ramp to move to the second position;
   the ramp hinge creating a frictional ramp force and the bias member creating a bias force, both of which resist movement of the tilt ramp from the first position to the second position, the ramp force and the bias force being chosen so that a downward force on the tilt ramp of four grams at a point one and five-sixteenth inches from the hinge axis will cause the tilt ramp to move from the first position to the second position.

7. A rodent trap according to claim 6 wherein said tube is attached to said top wall of said box; said top wall of said box being hinged to said box for movement from an open position wherein said tube is outside said box to a closed position wherein said tube is within said box and said first open end thereof is in registered alignment with said first mouse opening.

8. The rodent trap of claim 6 wherein the ramp hinge comprises a pin having opposite pin ends, a pair of ramp hinge bosses attached to the opposite side walls of the tube and having pin receptacles for pivotally receiving the opposite ends of the pin.

9. The rodent trap of claim 8 wherein a flap engages the entrance end of the tilt ramp, a flap hinge permitting the flap to pivot about a flap axis from an open position to a closed position in response to movement of the tilt ramp from the first position to the second position.

10. The rodent trap of claim 9 wherein the hinge flap comprises a pin having opposite pin ends, a pair of flap hinge bosses attached to the opposite side walls of the tube and having pin receptacles for pivotally receiving the opposite ends of the pin.

11. The rodent trap of claim 9 and further comprising an angular flange connected to and extending downwardly from the top wall of the box, the flap engaging the angular flange when the tilt ramp is in the second position to form a closure to the first open end of the tube.

12. The rodent trap of claim 9 and further comprising a cam surface between the tilt ramp and the flap for reducing friction there between during movement of the tilt ramp from the first position to the second position.

13. A rodent trap comprising:
- a box having a top wall, a bottom wall, end walls, a front wall, and a rear wall enclosing a trap compartment;
- at least a first mouse opening in one of the front, rear, and side walls of the box;
- an elongated tube within the trap compartment, the tube having a first open end in communication with the first mouse opening and having a second end in communication with the trap compartment;
- an elongated tilt ramp within the tube having an entrance end adjacent the mouse opening of the box and having an exit end adjacent the exit opening of the tube;
- a ramp hinge pivotally mounting the tilt ramp within the tube form tilting movement about a hinge axis from a first position wherein the entrance end is adjacent the bottom wall of the box adjacent the mouse opening and the exit end is elevated above the entrance end, to a second position wherein the exit end is lowered from the first position;
- a bias member connected to the tilt ramp and biasing the tilt ramp to the first position, the bias member yielding in response to the weight of a mouse adjacent the exit end of the tilt ramp to permit the tilt ramp to move to the second position;
- the ramp hinge comprising a ramp hinge pin having first and second opposite ends, a first boss attached to the tube and having a boss receptacle receiving the first end of the ramp hinge pin, and a second boss attached to the tube and having a boss receptacle receiving the second end of the ramp hinge pin;
- a flap mounted to the tube by a flap hinge and engaging the tilt ramp adjacent the entrance end of the tilt ramp;
- the flap being pivotal about the flap hinge from an open position permitting a mouse to enter the entrance end of the tube to a closed position closing off the entrance and of the tube in response to the movement of the tilt ramp from the first to the second positions; and
- a cam surface extending upwardly from the entrance end of the tilt ramp and engaging the flap.

* * * * *